United States Patent
Sergeev

(10) Patent No.: US 10,685,447 B2
(45) Date of Patent: Jun. 16, 2020

(54) METHOD FOR IDENTIFYING AN OBJECT IN A REGION SURROUNDING A MOTOR VEHICLE, DRIVER ASSISTANCE SYSTEM AND MOTOR VEHICLE

(71) Applicant: VALEO Schalter und Sensoren GmbH, Bietigheim-Bissingen (DE)

(72) Inventor: Nikolai Sergeev, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 234 days.

(21) Appl. No.: 15/748,098

(22) PCT Filed: Jul. 26, 2016

(86) PCT No.: PCT/EP2016/067715
§ 371 (c)(1),
(2) Date: Jan. 26, 2018

(87) PCT Pub. No.: WO2017/017077
PCT Pub. Date: Feb. 2, 2017

(65) Prior Publication Data
US 2018/0211394 A1 Jul. 26, 2018

(30) Foreign Application Priority Data
Jul. 28, 2015 (DE) .................... 10 2015 112 289

(51) Int. Cl.
*G06T 7/20* (2017.01)
*G06T 7/00* (2017.01)
*G08G 1/16* (2006.01)

(52) U.S. Cl.
CPC .............. *G06T 7/20* (2013.01); *G06T 7/97* (2017.01); *G06T 2207/10016* (2013.01);
(Continued)

(58) Field of Classification Search
CPC ... G06T 7/20; G06T 7/97; G06T 2207/30252; G06T 2207/30241; G06T 2207/10016;
(Continued)

(56) References Cited

U.S. PATENT DOCUMENTS

| 9,064,418 B2* | 6/2015 | Takemura | G08G 1/167 |
| 2014/0104408 A1* | 4/2014 | Nanba | G08G 1/164 |
| | | | 348/119 |

(Continued)

FOREIGN PATENT DOCUMENTS

| DE | 10 2007 032 075 A1 | 1/2008 |
| DE | 10 2007 054048 A1 | 5/2009 |

(Continued)

OTHER PUBLICATIONS

International Search Report of the International Searching Authority issued in PCT/EP2016/067715 dated Nov. 8, 2016 (4 pages).

(Continued)

*Primary Examiner* — Bobbak Safaipour
(74) *Attorney, Agent, or Firm* — Osha Liang LLP

(57) ABSTRACT

A method for identifying an object in a surrounding region of a motor vehicle as a stationary object is disclosed. The surrounding region is captured in images using a vehicle-side capture device and the object is detected in the captured images using an image processing device. A first position of the object in the surrounding region relative to the motor vehicle is estimated on the basis of a first captured image, a movement sequence of the object in image coordinates is determined on the basis of the first image and a second captured image, a first movement sequence that characterizes a first, stationary object in the image coordinates is determined proceeding from the first estimated position in the surrounding region, and the captured object is identified as a stationary object on the basis of a comparison of the (Continued)

movement sequence of the captured object to the first characterizing movement sequence.

13 Claims, 3 Drawing Sheets

(52) U.S. Cl.
CPC ............ *G06T 2207/30241* (2013.01); *G06T 2207/30252* (2013.01); *G08G 1/166* (2013.01)

(58) Field of Classification Search
CPC ............ G08G 1/166; B60W 2550/10; B60W 2550/141; B60W 2550/22; B60W 40/02; G06K 9/00791
See application file for complete search history.

(56) References Cited

U.S. PATENT DOCUMENTS

2015/0310621 A1* 10/2015 Matono ............... H04N 13/271
                                                    348/47
2017/0270370 A1*  9/2017 Utagawa .................. B60R 1/00
2018/0118100 A1*  5/2018 Kjaer-Lohse .......... B60Q 1/346

FOREIGN PATENT DOCUMENTS

| DE | 10 2008 063 328 A1 | 7/2010 |
| EP | 2 127 945 A2 | 12/2009 |
| EP | 2 549 457 A1 | 1/2013 |
| JP | 2011-081613 A | 4/2011 |
| JP | 2011-192226 A | 9/2011 |

OTHER PUBLICATIONS

Written Opinion of the International Searching Authority issued in PCT/EP2016/067715 dated Nov. 8, 2016 (6 pages).
German Search Report issued in corresponding Application No. 10 2015 112 289.8 dated Jul. 21, 2016 (10 pages).
Notice of Preliminary Rejection issued in corresponding Korean Patent Application No. 2018-7005670, dated Apr. 17, 2019 (11 pages).
Notification of Reason for Rejection issued in corresponding Japanese Patent Application No. 2018-504280, dated Apr. 19, 2019 (5 pages).

* cited by examiner

METHOD FOR IDENTIFYING AN OBJECT IN A REGION SURROUNDING A MOTOR VEHICLE, DRIVER ASSISTANCE SYSTEM AND MOTOR VEHICLE

The invention relates to a method for identifying an object in a region surrounding a motor vehicle as a stationary object, wherein in the method, the surrounding region is captured in images using a vehicle-side capture device and the object is detected in at least one of the captured images using an image processing device. The invention additionally relates to a driver assistance system and to a motor vehicle.

It is already known from the prior art to mount capture devices, such as cameras, on motor vehicles to thereby capture a region surrounding the motor vehicle in images. Information can be extracted from said images, for example by recognizing objects in the images using an image processing device. DE 10 2008 063 328 A1, for example, proposes to determine a change in a pitch angle of a motor vehicle on the basis of captured objects.

Said information can be provided to a driver assistance system of the motor vehicle, for example an automated full-beam regulation system. The information extracted from the images can be used, for example, to regulate the full beam emitted by the motor vehicle so that, on the one hand, the region surrounding the motor vehicle, in particular a road of the motor vehicle, is illuminated as well as possible, and, on the other, so that other road users, such as oncoming vehicles, are not dazzled. To this end, the captured objects in the region surrounding the motor vehicle initially need to be classified or identified so that oncoming vehicles, for example, are recognized as such in the first place.

It is the object of the present invention to be able to reliably and simply identify objects in a region surrounding a motor vehicle.

This object is achieved according to the invention by way of a method, a driver assistance system and a motor vehicle having the features in accordance with the independent patent claims.

A method according to the invention serves for identifying an object in a region surrounding a motor vehicle as a stationary object. In the course of the method, the surrounding region is captured in images using a vehicle-side capture device and the object is recognized in at least one of the captured images using an image processing device. Moreover, a first position of the object in the surrounding region relative to the motor vehicle is estimated on the basis of at least one first captured image, a movement sequence of the object in image coordinates is determined on the basis of the first image and at least one second captured image, a first movement sequence that characterizes a stationary object in the image coordinates is determined proceeding from the first estimated position in the surrounding region, and the captured object is identified as a stationary object on the basis of a comparison of the movement sequence of the captured object to the first characterizing movement sequence.

The method is consequently used to differentiate between whether the objects in the surrounding region are stationary objects or non-stationary objects. If an object is identified using the method as being non-stationary, it is assumed that the object is a dynamic object. In the method, the surrounding region, in particular the surrounding region located in front of, in particular laterally in front of, the motor vehicle in the driving direction is captured in images using the vehicle-side capture device which comprises, for example, at least one camera. The camera is in particular designed here to two-dimensionally capture the surrounding region. The image processing device is designed to recognize a two-dimensional projection of the object in the at least one captured image from image data of the at least one captured image and to thus recognize the object in the surrounding region.

According to the invention, provision is now made for a first position of the object, i.e. of the real object, in the surrounding region relative to the motor vehicle to be estimated on the basis of the first captured image. The first image can be the image in which the object was recognized by the image processing device. The first position of the real object in the surrounding region can be estimated on the basis of the two-dimensional projection of the object on the first image, for example on the basis of two-dimensional geometric measurements of the object on the image. The first position is here determined in particular in a world coordinate system and describes a first, possible distance of the captured object from the motor vehicle. The world coordinate system can be, for example, a vehicle coordinate system having a first axis along a vehicle lateral direction, a second axis along a vehicle longitudinal direction, and a third axis along a vehicle height direction. The distance of the object from the motor vehicle is thus determined in particular only on the basis of the captured images. The distance is in particular not directly measured. Consequently, the camera can have a particularly simple design and does not need to be an expensive time-of-flight camera, for example.

On the basis of the first image and at least a second image, a movement sequence of the object, that is to say the projection of the object, in the image coordinates is determined. The image coordinates are here determined in a two-dimensional image coordinate system having a first, for example horizontal, image axis and a second, for example vertical, image axis. The movement sequence in the image coordinates is determined here such that, in the first image, an image position of the object, for example the image position of a projection point of the object, in the image coordinates is determined and, in the at least one second image, an image position of the object, for example the image position of the projection point of the object in the second image, in the image coordinates is determined. The change in the image positions of the object between the two images here gives the movement sequence of the object. The image position change of the object, that is to say the movement of the projection of the object in the recorded images, is obtained by way of the motor vehicle travelling on a road. Due to the motor vehicle travelling, the image positions of the object in the image change and thus the image coordinates of the object between the at least two images change. The movement sequence of the captured object in the image coordinates here corresponds to an instantaneous movement sequence, or an actual movement sequence, of the projection of the object in image coordinates. The time period between two successively recorded images can be, for example, between 50 ms and 80 ms, in particular 60 ms. As a result, an image position of the object can be determined every 60 ms, for example.

In addition, the first movement sequence that characterizes a stationary object in the image coordinates is now determined. The first characterizing movement sequence here corresponds to a first predetermined movement sequence that the projection of the object has if the object is a stationary object at the first estimated position. To determine the first characterizing movement sequence, for example image positions of a specified stationary reference object at the first estimated position can be determined for the at least two images. The movement sequence of the captured object and the first characterizing movement sequence can be determined as respectively one trajectory and be represented, for example, in one of the captured images.

To identify the object as a stationary object, the instantaneous movement sequence and the first predetermined movement sequence can then be compared. To this end, for example a distance between the trajectories can be determined in the image. If, for example, the instantaneous movement sequence is congruent with the first predetermined movement sequence, or if the instantaneous movement sequence deviates from the first predetermined movement sequence by at most a specified threshold value, the captured object can be identified as a stationary object. However, if the instantaneous movement sequence deviates from the first predetermined movement sequence by more than the specified threshold value, the captured object is identified as a dynamic object.

The method according to the invention can be used therefore to classify or identify in a particularly simple manner the object in the surrounding region from captured images of the surrounding region.

In addition, a second position of the object in the surrounding region relative to the motor vehicle is estimated preferably on the basis of the at least one first captured image, and, proceeding from the second estimated position in the surrounding region, a second movement sequence that characterizes a stationary object in the image coordinates is determined, and the captured object is identified on the basis of the comparison of the movement sequence of the captured object to the second characterizing movement sequence. In other words, in addition to the first, possible distance of the object from the motor vehicle, a second, possible distance of the object from the motor vehicle is estimated. The second distance is also determined in the world coordinate system.

The invention is here based on the finding that it is not possible to accurately determine the distance of the object on the basis of the image that is two-dimensionally captured by the capture device, but can vary in particular along a camera axis. Therefore, two possible, plausible distances of the object from the motor vehicle are estimated. Thereupon, it is possible, in addition to the first characterizing movement sequence in image coordinates, which is determined for the reference object at the first position in world coordinates, for the second characterizing movement sequence in image coordinates to be determined for the reference object at the second position in world coordinates. The second characterizing movement sequence here corresponds to a second predetermined movement sequence which the object has if the object is a stationary object at the second estimated position. The second characterizing movement sequence can likewise be determined as a trajectory and be represented in the captured image. In addition, the instantaneous movement sequence is compared to the second predetermined movement sequence. The captured object can then be identified as being stationary if the instantaneous movement sequence is congruent with the second predetermined movement sequence or deviates from the second predetermined movement sequence at most by a further specified threshold value. By determining the second predetermined movement sequence and due to the comparison of the instantaneous movement sequence to the two predetermined movement sequences, the captured object can be particularly reliably classified and identified as a stationary object.

With particular preference, the captured object is identified as a stationary object if the movement sequence of the captured object is within a corridor formed by the first and the second characterizing movement sequences. In other words, the first and the second movement sequence in the image coordinates form the corridor, that is to say a movement region within which the captured object moves, if it is a stationary object. Provision can also be made here for the corridor to be extended by a tolerance region, with the result that the captured object is identified as a stationary object even if the movement sequence of the captured object is outside the corridor, but within the tolerance region. By representing all movement sequences as trajectories in one of the images, it is possible in a particularly simple manner to determine whether the trajectory of the captured object falls within the corridor.

It has proven advantageous if a first height that is characteristic of the stationary object is specified for the captured object and the first position in the surrounding region relative to the motor vehicle is determined on the basis of the at least one first image and on the basis of the first height specified for the object, and a second height that is characteristic of the stationary object is specified for the captured object and the second position in the surrounding region relative to the motor vehicle is determined on the basis of the at least one second image and on the basis of the second height specified for the object. In order then to plausibly estimate the positions of the object in world coordinates on the basis of the two-dimensional images, two different, plausible heights for the object are specified. The first height here corresponds to a maximum height that the predetermined stationary reference object can have, for example, and the second height corresponds to a minimum height that the predetermined stationary reference object can have. The minimum and the maximum heights can be stored, for example, for the image processing device, with the result that the positions of the object in world coordinates can be determined simply and quickly on the basis of the at least one captured first image using the stored heights. Consequently, the distances of the object from the motor vehicle can be plausibly and quickly determined, in particular without the need to directly measure the distance. It is thus possible to dispense with a separate sensor device for distance measurement and/or the configuration of the cameras as a time-of-flight camera.

Provision may be made for a vehicle speed and/or an angular rate of the motor vehicle about a vehicle height axis to be captured to determine a characterizing movement sequence. On the basis of the vehicle speed and/or the angular rate, it is thus possible to determine the position of the object, proceeding from the first estimated position and the second estimated position for each time point at which an image is captured, in the case of a stationary object in the world coordinate system, that is to say for example the position of the reference object in the surrounding region relative to the motor vehicle, and to convert it into the image positions in the corresponding image coordinates of the image captured at that time point. Consequently, it is possible to determine for each image the image position of the reference object and thus a predetermined image position which the captured object in the image has if the captured object is stationary. The change in the predetermined image positions between two images gives the predetermined movement sequence, that is to say the movement sequence that characterizes a stationary object.

In addition, the characterizing movement sequences are determined under the assumption that the motor vehicle travels on an even road. An even road is here a road that has neither bumps nor potholes. That means that it is assumed that the motor vehicle performs no pitch movement, i.e. no rotational movement about the vehicle transverse axis, during travelling. In other words, a pitch angle of the motor vehicle does not change during travel. As a result, the characterizing movement sequences can be determined without the need to go to the effort of capturing the pitch angle of the motor vehicle.

In accordance with an embodiment, only image coordinates of a predetermined direction are compared during the comparison of the movement sequence of the captured object to the characterizing movement sequence. Preferably, only image coordinates in the horizontal direction are compared to one another. The invention is here based on the finding that, even if the captured object is a stationary object, the vertical image coordinates of the captured object would differ significantly from the vertical image coordinates of the characterizing movement sequences if the motor vehicle travels on an uneven road having bumps. Due to the uneven road, the motor vehicle performs a pitch movement during travel, as a result of which the captured object appears to move in the vertical direction in the image. This apparent vertical movement of the captured object in the image coordinates can result in the movement sequence of the captured object, determined on the basis of the image positions of the projection of the object, being outside the corridor formed by the two characterizing movement sequences. The characterizing movement sequences are specifically determined in particular under the assumption that the motor vehicle moves along an even road having no bumps. This means that the apparent vertical movement of the stationary object is not reflected in the characterizing movement sequences. For this reason, during the examination as to whether the movement sequence of the captured object is within the corridor, only the image coordinates in the horizontal direction are taken into consideration. The image coordinates in the vertical direction are not taken into consideration. As a result, an object can be reliably identified as a stationary object in particular without the need to separately capture the pitch angle even in the case of a road on which the motor vehicle performs a pitch movement, for example due to potholes.

In a development of the invention, the position of the captured object is estimated on the basis of a first image captured at a current time point, and the movement sequence of the captured object is determined on the basis of at least one second image captured at a time point before the current time point. That means that the current position of the object in the world coordinates is estimated and, proceeding from the current position, the already performed movement of the captured object is determined. In other words, the movement sequence of the captured object is determined retrospectively, i.e. on the basis of the recorded history of image coordinates. The characterizing movement sequence is also hereby retrospectively determined, i.e. a movement that the captured object would have performed if it were a stationary object. As a result, the object can be classified particularly quickly as a stationary object or as a dynamic object.

The object as a stationary, light-reflecting object, in particular a delineator post or a road sign, is preferably identified as the predetermined object. A light-reflecting object is here understood to mean an object that has an active element reflecting light. Such an element can be, for example, a reflector which reflects the light, such as for example like a cat's-eye. Such objects can be, for example, delineator posts or reflector posts, which are generally located at a side of the road of the motor vehicle and facilitate orientation for the driver of the motor vehicle in particular in the dark or at night or when visibility is poor. Such objects can also be road signs that actively reflect light for improved visibility. Due to the objects that actively reflect light, light that was emitted for example by a headlight of the motor vehicle to illuminate the road is reflected in a directional or defined manner by the object back to the motor vehicle and can therefore be erroneously detected by the image processing device, in particular at night, as an oncoming vehicle emitting light. Using the method in accordance with the invention, which can identify objects as being stationary or dynamic, it is advantageously possible to prevent such a mix-up from happening.

Here, the object can be identified as a stationary light-reflecting object, in particular as a delineator post and/or as a road sign, if it has been detected, on the basis of the at least one captured first image and/or second image, that the captured object emits light in a directional or defined manner in the direction of the motor vehicle and it has been detected, on the basis of the comparison of the movement sequence of the captured light-emitting object to a movement sequence characteristic of a stationary object, that the captured object is stationary. In other words, it is determined, for example on the basis of the first detected image, whether the object emits light in a directional manner in the direction of the motor vehicle. It is also possible to estimate the position of the object on the basis of this image. Subsequently, the movement sequence of the captured light-emitting object can be determined and the object can be identified as being stationary on the basis of the comparison to the characterizing movement sequence.

Preferably, regulation of a light emitted by a headlight of the motor vehicle for illuminating a road of the motor vehicle is blocked if the object was identified as a stationary object which actively reflects light. In other words, no automatic full-beam regulation, for example dipping of the light, is performed if it has been found that the captured object is not an oncoming vehicle but for example a delineator post or a road sign. It is thus possible to prevent the automatic full-beam regulation from being performed unnecessarily.

The invention additionally relates to a driver assistance system, in particular for full-beam regulation, for identifying an object in a region surrounding a motor vehicle as a stationary object. The driver assistance system comprises a vehicle-side capture device, for example a camera, for capturing the surrounding region in images and an image processing device for recognizing the object in at least one of the captured images. Moreover, the image processing device is configured to estimate a first position of the object in the surrounding region relative to the motor vehicle on the basis of at least one first captured image, to determine a movement sequence of the object in image coordinates on the basis of the first image and at least one second captured image, to determine a first movement sequence that characterizes a stationary object in the image coordinates proceeding from the first estimated position in the surrounding region, and to identify the captured object as a stationary object on the basis of a comparison of the movement sequence of the captured object to the first characterizing movement sequence.

A motor vehicle according to the invention comprises a driver assistance system according to the invention. The motor vehicle is configured in particular as a passenger vehicle. The driver assistance system can here control, for example, headlights of the motor vehicle to regulate the light emitted by the headlights.

The preferred embodiments introduced with respect to the method according to the invention, and the advantages thereof, apply accordingly to the driver assistance system according to the invention and to the motor vehicle according to the invention.

The terms "top", "bottom", "front", "rear", "horizontal" (a-direction), "vertical" (b-direction) etc. indicate positions and orientations based on appropriate observation of the captured images. The terms "internal", "external", "lateral", "right", "left", "top", "bottom", "vehicle height axis" (z-direction), "vehicle longitudinal axis" (y-direction), "vehicle transverse axis" (x-direction) etc. indicate positions and orientations based on an observer standing in front of the vehicle and looking in the direction of the vehicle longitudinal axis.

Further features of the invention can be gathered from the claims, the figures and the description of the figures. The features and feature combinations mentioned previously in the description and the features and feature combinations yet to be mentioned in the description of the figures and/or shown alone in the figures can be used not only in the combinations which are indicated in each case, but also in other combinations or alone, without departing from the scope of the invention. Configurations of the invention that are not explicitly shown and explained in the figures but can be gathered and realized through separate feature combinations from the explained configurations are also thus to be considered as being included and disclosed. Configurations and feature combinations that do not have all the features of an independent claim of original wording are consequently also to be considered to be disclosed.

The invention will be explained in more detail below on the basis of a preferred exemplary embodiment and with reference to the attached drawings.

In the drawings.

Identical elements and elements having identical functions are provided in the figures with the same reference numerals.

Figure 1:
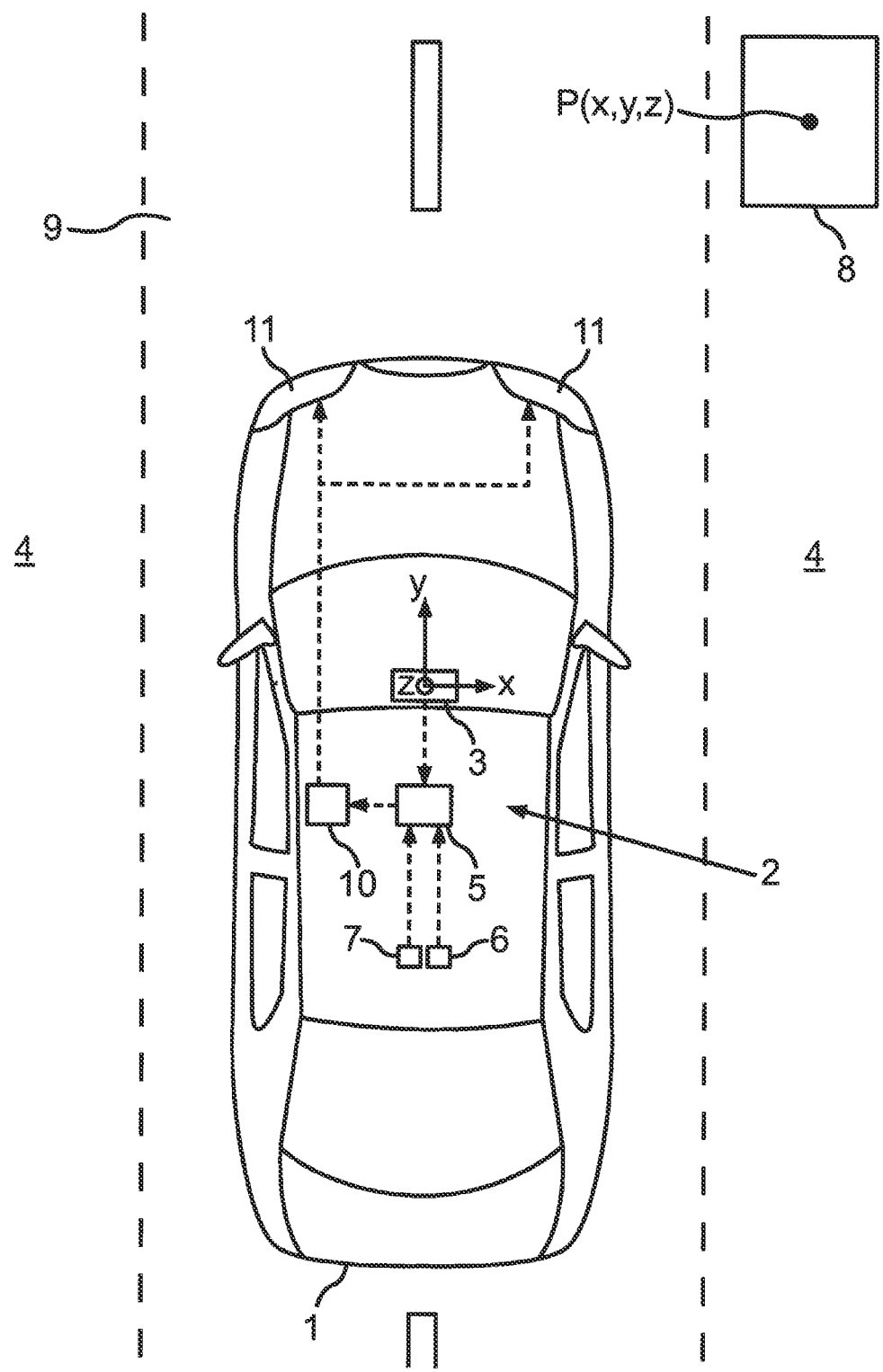
FIG. 1 shows a schematic illustration of an embodiment of a motor vehicle according to the invention.

FIG. 1 shows a motor vehicle 1 having a driver assistance system 2. The driver assistance system 2 comprises a vehicle-side capture device 3, which can comprise at least one camera. The capture device 3 serves for capturing a surrounding region 4 of the motor vehicle 1 in two-dimensional images 12, 14 (see FIGS. 2a, 2b, 2c). The capture device captures in particular images 12, 14 of a surrounding region 4 located—in the direction of travel (y-direction)—in front of and laterally in front of the motor vehicle 1 as the motor vehicle 1 travels on a road 9.

The driver assistance system 2 additionally comprises an image processing device 5, which is configured to process the images 12, 14 of the surrounding region 4 captured by the capture device 3 and to extract for example information from the captured images 12, 14. The driver assistance system 2, which serves in particular for full-beam regulation, can control, based on the information extracted from the images 12, 14, headlights 11 of the motor vehicle 1 in order to regulate or influence the light emitted by the headlights 11. In addition, the driver assistance system 2 can have a speed sensor 6 for capturing a speed of the motor vehicle 1 travelling on the road 9 and an angular rate sensor 7 for capturing an angular rate of the motor vehicle 1 about a vehicle height axis (z-direction) of the motor vehicle 1.

The image processing device 5 is configured for recognizing an object 8 in at least one of the images 12, 14 captured by the capture device 3. The object 8 has, in the surrounding region 4, a position P(x, y, z) relative to the motor vehicle 1. The position P is here a position in a world coordinate system x, y, z, which is here defined as a vehicle coordinate system. The x-axis of the world coordinate system here runs along a vehicle lateral direction, the y-axis runs along a vehicle longitudinal direction, and the z-axis runs along a vehicle height direction.

The image processing device 5 is configured to classify the object 8, that is to say to identify whether the object 8 is a stationary object that is positionally fixed in the surrounding region 4, or a dynamic object. If the captured object 8 is a dynamic object, for example in the form of an oncoming vehicle, a control device 10 of the driver assistance system 2 can, for example, control the headlights 11 of the motor vehicle 1 to dip the light emitted by the headlights 11 and thus prevent dazzling a driver of the oncoming vehicle. Regulating the light emitted by the headlights 11 in this way should, however, be blocked if the image processing device 5 has detected that the object 8 is a stationary object, for example in the form of a delineator post 13 or a road sign.

Figure 2A:
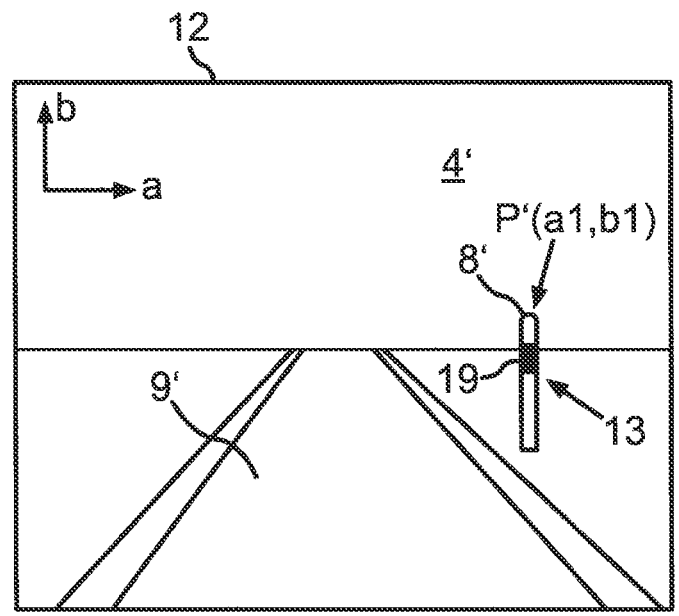
FIGS. 2a, 2b, 2c show schematic illustrations of image which were recorded by a vehicle-side capture device.
Figure 2B:
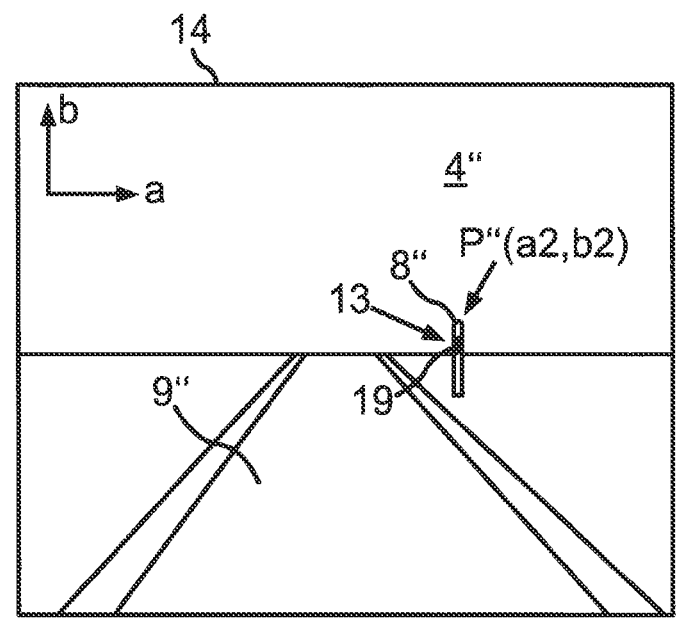

Identifying the object 8 as a stationary object, in particular as a delineator post 13, will be explained with reference to FIG. 2a, FIG. 2b, and FIG. 2c. FIG. 2a shows an image 12 of the surrounding region 4 recorded at a first time point by the capture device 3. The first image 12 shows the surrounding region 4' as a two-dimensional projection of the surrounding region 4, the road 9' as a two-dimensional projection of the road 9, and the object 8' as a two-dimensional projection of the object 8 at the first, in particular current, time point. An image position P' of the object 8' is indicated using image coordinates a, b of a two-dimensional image coordinate system. The object 8' has in the image 12 a first image position P'(a1, b1). Based on the two-dimensional first image 12, a first position P1(x1, y1, z1) of the real object 8 (see FIG. 3) relative to the motor vehicle 1, that is to say a first, possible distance of the object 8 from the motor vehicle 1, and a second position P2(x2, y2, z2) of the real object 8 relative to the motor vehicle 1, that is to say a second, possible distance of the object 8 from the motor vehicle 1, are estimated. The positions P1, P2 are here determined in the world coordinate system (x, y, z).

Figure 3:
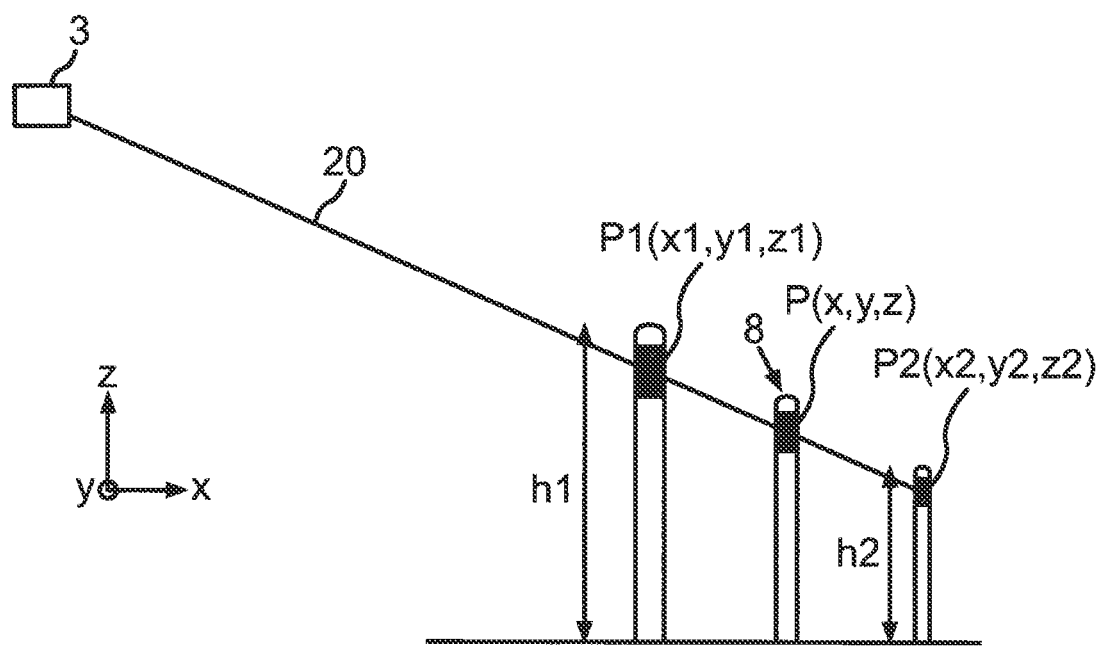
FIG. 3 shows a schematic illustration of an embodiment or determining the position of a captured object.

To determine the first position P1, a first, maximum height h1 for the object 8 is specified or assumed, as shown in FIG. 3. To determine the second position P2, a second, minimum height h2 for the object 8 is assumed. The possible positions P1, P2 of the real object 8 can then be determined on the basis of the image 12 and the heights h1, h2. The actual position P(x, y, z) of the object 8 is here located along a camera axis 20 between the two positions P1, P2. The heights h1, h2 can here be, for example, a typical specified maximum height and a typical specified minimum height of a delineator post 13.

To identify the captured object 8 as a stationary object, first a movement sequence 15 (see FIG. 2c) of the object 8', 8", that is to say a movement sequence 15 of the projection of the captured object 8, in the image coordinates a, b is determined. To this end, for example an image position P' of the object 8' in the first image 12 and an image position P"(a2, b2) of the object 8" in a second image 14, recorded at a second time point, can be determined. The second image 14 shows the surrounding region 4″ as a two-dimensional projection of the surrounding region 4, the road 9″ as a two-dimensional projection of the road 9, and the object 8″ as a two-dimensional projection of the object 8 at the second time point. The second time point here occurs in particular before the first, current time point. The change in the image positions P′, P″ can be determined as a trajectory characterizing the movement sequence 15 and be represented, for example, in the first image 12 (see FIG. 2c).

In addition, proceeding from the first estimated position P1 and the second estimated position P2, movement sequences 16, 17, which are characteristic of a stationary object, in image coordinates a, b are determined. The first characterizing movement sequence 16 is here characteristic of a stationary object at the first, estimated position P1, and the second characteristic movement sequence 17 is characteristic of a stationary object at the second, estimated position P2. The characterizing movement sequences 16, 17 are determined for example by determining the image positions of a stationary reference object in the images 12, 14 in image coordinates a, b. To this end, for the image positions of the stationary reference object in the first image 12, the first position P1 and the second position P2 are converted into image coordinates a, b. To determine the image positions of the stationary reference object in the second image 14, a further, first position of the stationary reference object in world coordinates x, y, z and a further, second position of the stationary reference object in world coordinates x, y, z, which the reference object has at the second time point, are converted into image coordinates a, b. The further, first and the further, second positions can be determined, for example, on the basis of the speed and/or the angular rate of the motor vehicle 1, which is captured using the speed sensor 6 and/or using the angular rate sensor 7. In addition, the characterizing movement sequences 16, 17 are determined under the assumption that the road 9, on which the motor vehicle 1 travels, is even and has no potholes or bumps, for example. The movement sequences 16, 17, which can likewise be represented as trajectories in the first image 12 (see FIG. 2c), form a corridor 18. The captured object 8 is then identified as a stationary object if the movement sequence 15 of the captured object 8′, 8″ falls within the corridor 18.

Figure 2C:
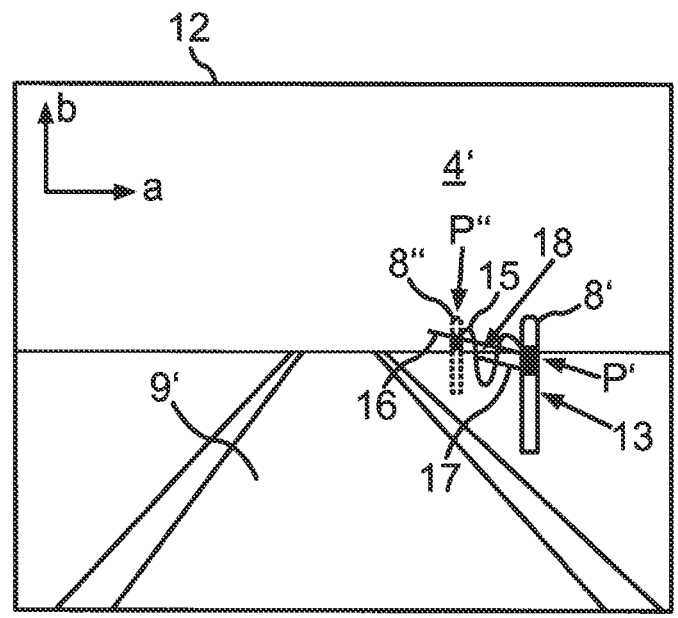

FIG. 2c shows that the horizontal coordinates a of the movement sequence 15 are located within the corridor 18, but not the vertical coordinates b of the movement sequence 15. The movement sequence 15 shows the movement sequence of the object 8′, 8″ for the motor vehicle 1 here as it travels on a road 9, which has bumps. Due to these bumps, the motor vehicle 1 performs a pitch movement about the vehicle transverse axis, that is to say a pitch movement along the z-axis. Due to said pitch movement, the object 8′, 8″ appears to move in the height direction (b-direction) in the image coordinates a, b. In order to be able to identify the captured object 8 as a stationary object despite the pitch movement and without having to capture the pitch movement, only the horizontal image coordinates a are considered or taken into consideration during the examination as to whether the movement sequence 15 falls within the corridor 18. The vertical image coordinates b are not taken into consideration.

On the basis of the comparison of the movement sequence 15 to the characterizing movement sequences 16, 17, the captured object 8 can be identified as a stationary object. In order to identify the object 8 as the delineator post 13, it is additionally possible to examine whether the object 8 actively reflects light in the direction of the motor vehicle 1. In order to actively reflect light, the delineator post 13 has reflectors 19. The image processing device 5 can, for example on the basis of the first image 12, detect that the object 8′, 8″ emits light in the direction of the motor vehicle 1. Finally, the image processing device 5 can capture the object 8 as a stationary object on the basis of the movement sequences 15, 16, 17 and thus identify the object 8 correctly as the delineator post 13. Once the object 8 has been identified as a delineator post 13, it is possible for the control device 10 to prevent the headlights 11 from unnecessarily being controlled to regulate the full beam.

The invention claimed is:

1. A method for identifying an object in a surrounding region of a motor vehicle as a stationary object, the method comprising:
    capturing the surrounding region in images using a vehicle-side capture device;
    detecting the object in at least one of the captured images using an image processing device;
    estimating a first position of the object in the surrounding region relative to the motor vehicle on the basis of at least one first captured image;
    determining a movement sequence of the object in image coordinates on the basis of the first image and at least one second captured image;
    determining a first movement sequence that characterizes a first, stationary object in the image coordinates proceeding from the first estimated position in the surrounding region;
    identifying the captured object as a stationary object on the basis of a comparison of the movement sequence of the captured object to the first characterizing movement sequence;
    estimating a second position of the object in the surrounding region relative to the motor vehicle additionally on the basis of the at least one first image;
    proceeding from the second estimated position in the surrounding region, determining a second movement sequence that characterizes a stationary object in the image coordinates; and
    identifying the captured object on the basis of the comparison of the movement sequence of the captured object to the second characterizing movement sequence.

2. The method according to claim 1, wherein the captured object is identified as a stationary object when the movement sequence of the captured object is within a corridor formed by the first and the second characterizing movement sequences.

3. The method according to claim 1, wherein:
    a first height that is characteristic of the stationary object is specified for the captured object and the first position in the surrounding region is determined on the basis of the at least one first image and on the basis of the first height specified for the object, and
    a second height that is characteristic of the stationary object is specified for the captured object, and the second position in the surrounding region is determined on the basis of the at least one first image and on the basis of the second height specified for the object.

4. The method according to claim 1, characterized in that a vehicle speed and/or an angular rate of the motor vehicle about a vehicle height axis is captured to determine a characterizing movement sequence.

5. The method according to claim 1, wherein a characterizing movement sequence is determined under the assumption that the motor vehicle travels on an even road.

6. The method according to claim 1, wherein only image coordinates of a predetermined direction are compared when comparing the movement sequence of the captured object to the characterizing movement sequence.

7. The method according to claim 6, wherein only horizontal image coordinates of the predetermined direction are compared as the image coordinates when comparing the movement sequence of the captured object to a characterizing movement sequence.

8. The method according to claim 1, wherein the position of the captured object is estimated on the basis of a first image captured at a current time point and the movement sequence of the captured object is determined on the basis of at least one second image captured at a time point that occurred before the current time point.

9. The method according to claim 1, wherein the object as a stationary, light-reflecting object, comprising a delineator post or a road sign, is identified as the stationary object.

10. The method according to claim 9, wherein the captured object is identified as a stationary, light-reflecting object, when detection occurs, on the basis of the at least one captured first image, that the captured object emits light in a directional manner in the direction of the motor vehicle, and when detection occurs, on the basis of the comparison of the movement sequence of the captured light-emitting object to a movement sequence that characterizes a stationary object, that the captured object is stationary.

11. The method according to claim 9, wherein regulation of a light emitted by a headlight of the motor vehicle for illuminating a road of the motor vehicle is blocked when the object has been identified as the stationary, light-reflecting object.

12. A driver assistance system for full-beam regulation, for identifying an object in a surrounding region of a motor vehicle as a stationary object, the driver assistance system comprising:

a vehicle-side capture device for capturing the surrounding region in images; and an image processing device for recognizing the object in at least one of the captured images, wherein the image processing device is configured to:
estimate a first position of the object in the surrounding region relative to the motor vehicle on the basis of at least one first image, determine a movement sequence of the object in image coordinates on the basis of the first image and at least one second captured image, determine a first movement sequence that characterizes a stationary object in the image coordinates proceeding from the first estimated position in the surrounding region, identify the captured object as a stationary object on the basis of a comparison of the movement sequence of the captured object to the first characterizing movement sequence, estimate a second position of the object in the surrounding region relative to the motor vehicle additionally on the basis of the at least one first image, proceed from the second estimated position in the surrounding region, determining a second movement sequence that characterizes a stationary object in the image coordinates, and identify the captured object on the basis of the comparison of the movement sequence of the captured object to the second characterizing movement sequence.

13. A motor vehicle having a driver assistance system according to claim 12.

* * * * *